United States Patent [19]

Ikemori

[11] 4,364,644

[45] Dec. 21, 1982

[54] GAUSS TYPE LARGE APERTURE PHOTOGRAPHIC OBJECTIVE

[75] Inventor: Keiji Ikemori, Yokohama, Japan

[73] Assignee: Canon Kabushiki Kaisha, Tokyo, Japan

[21] Appl. No.: 209,493

[22] Filed: Nov. 24, 1980

[30] Foreign Application Priority Data

Nov. 27, 1979 [JP] Japan .................... 54-153258

[51] Int. Cl.³ .................... G02B 9/62; G02B 13/18
[52] U.S. Cl. .................... 350/464; 350/432
[58] Field of Search .................... 350/464, 432

[56] References Cited

U.S. PATENT DOCUMENTS 3,738,739  6/1973  Glatzel et al. .................... 350/464

FOREIGN PATENT DOCUMENTS

47-19386  6/1972  Japan .

Primary Examiner—John K. Corbin
Assistant Examiner—Rebecca D. Gass
Attorney, Agent, or Firm—Toren, McGeady & Stanger

[57] ABSTRACT

In the device disclosed, eight elements form a Gauss type wide or large aperture objective. The first element counting from the front is a positive meniscus lens of forward convexity, the second is a positive lens of convex curvature toward the front, the third is cemented to the second and is a negative lens of concave curvature toward the rear, the fourth is a negative lens of concave curvature toward the front, the fifth is cemented to the fourth and is a positive lens of convex curvature toward the rear, the sixth is a positive meniscus lens of rearward convexity, the seventh is a bi-convex lens with the rear surface of stronger curvature, and the eighth is a positive lens. The front surface of the second lens is aspherical so that as the distance from the optical axis increases, the deviation of the surface from the spherical surface of paraxial radius increases in a direction toward the front.

1 Claim, 33 Drawing Figures

FIG.1

GAUSS TYPE LARGE APERTURE PHOTOGRAPHIC OBJECTIVE

BACKGROUND OF THE INVENTION

1. Field of the Invention

This invention relates to large, or wide, aperture photographic objectives, particularly in the 50 mm focal length, F/1.2 class, and more particularly, to objectives using an aspherical surface for maintaining a long back focus and providing extremely good correction for flare at the fully open aperture, and also providing good correction for spherical aberration, field of curvature, and coma.

2. Description of the Prior Art

A Gauss type lens produces flare (sagittal flare) mainly because the forward and rearward lens surfaces adjacent the diaphragm are strong in negative curvature. However, limiting the curvature of these surfaces causes rapid deterioration in quality due to spherical aberrations and field curvature.

The index of refraction of the positive lens may be increased to facilitate aberrational corrections. However, optical glasses having the high refractive indices required for this purpose are not available at the present time. Therefore, in F/1.2 class lenses, effective removal of flare at fully open aperture, spherical aberration, and curvature of field becomes difficult with a spherical system.

An objective which corrects for flare and various aberrations using an aspherical surface is disclosed in Japanese Patent Publication No. Sho 47-19386, assigned to the assignee of the present invention.

SUMMARY OF THE INVENTION

The present invention makes the first surface of the second lens aspherical like in the above-cited Japanese Patent Publication No. Sho 47-19386. The aspherical surface is configured so that proceeding radially outwardly from the optical axis, the positive power is weakened. This makes possible extremely good compensation for the deteriorated spherical aberration due to the weakening of the negative curvature of the lens surfaces forwardly and rearwardly adjacent to the diaphragm. Further the use of a positive lens made up of a higher refractive index glass than that used in the above-described lens makes it possible even to correct the field of curvature properly. This achieves good correction of flare at the fully open aperture and the various aberrations.

The main feature of the present invention is, as will be described later, to provide a Gauss type eight-element objective with a wider image angle than was in the prior art while nevertheless solving the aberrational problem by satisfying the following conditions.

$$1.24 < \frac{D3 + D4}{D6 + D7} < 1.4 \tag{1}$$

$$1 < \frac{L}{f} < 1.1 \left( L = \sum_{i=1}^{13} Di \right) \tag{2}$$

$$1.78 < \frac{N1 + N2 + N5 + N6 + N7}{5} < 1.89 \tag{3}$$

$$2.17 < \frac{f}{R5} < 2.56 \tag{4}$$

-continued $$2.44 < \frac{f}{|R6|} < 2.7 \tag{5}$$

$$f6 < f7 < f8 \tag{6}$$

$$0.08 < n2 - n3 < 0.22 \tag{7}$$

$$0.1 < \frac{f}{R4} < 0.5 \tag{8}$$

DESCRIPTION OF THE PREFERRED EMBODIMENTS

Figure 1:
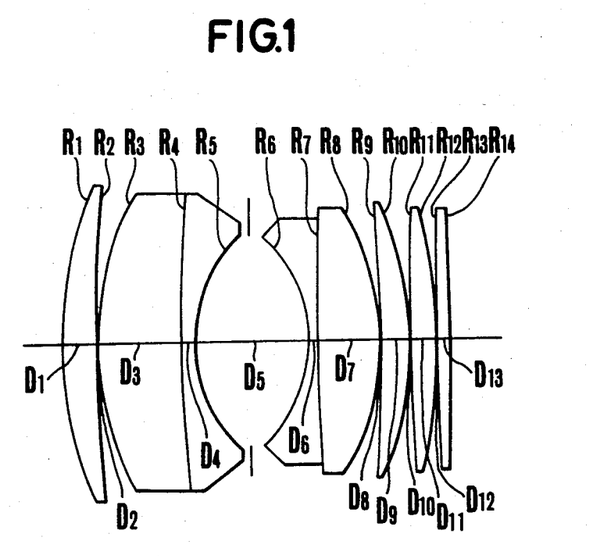
FIG. 1 is a lens block diagram of an embodiment of the present invention.
Figure 2A:
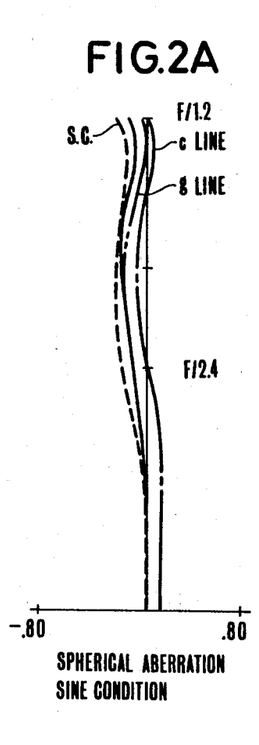
FIGS. 2 and 3 are aberration curves of Example 1 of the present invention.
Figure 2B:
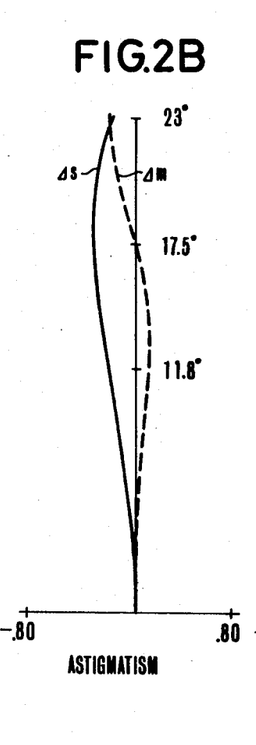
Figure 2C:
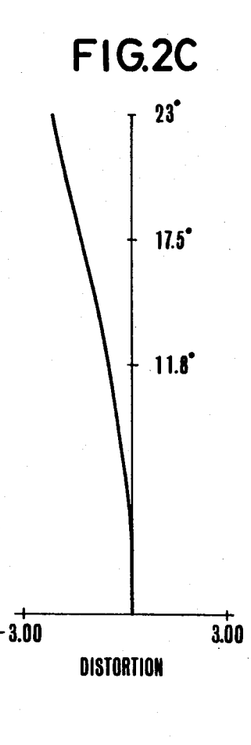
Figure 2D:
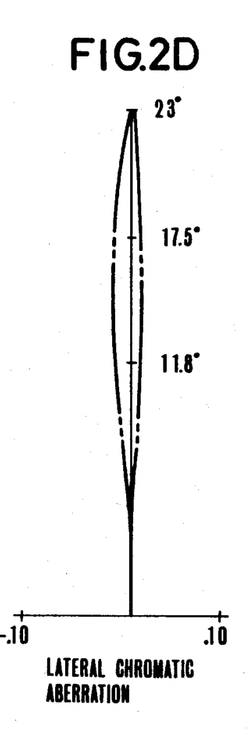
Figures 3A, 3B:
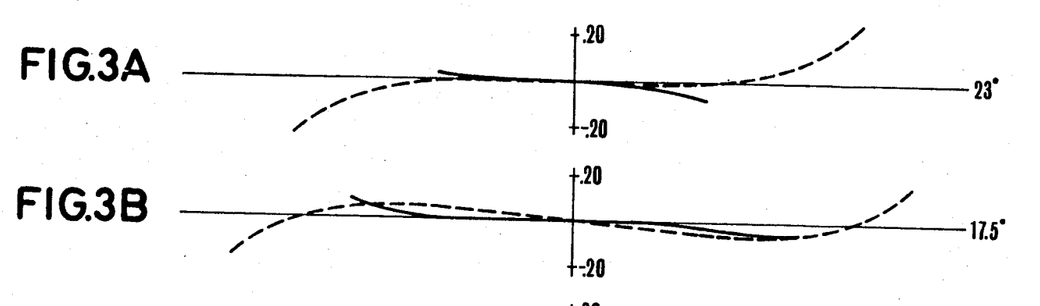
Figures 3C, 3D:
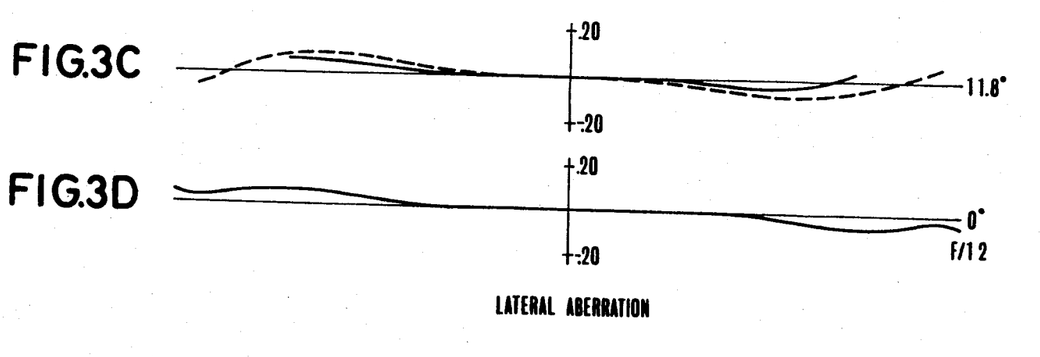
Figure 4A:
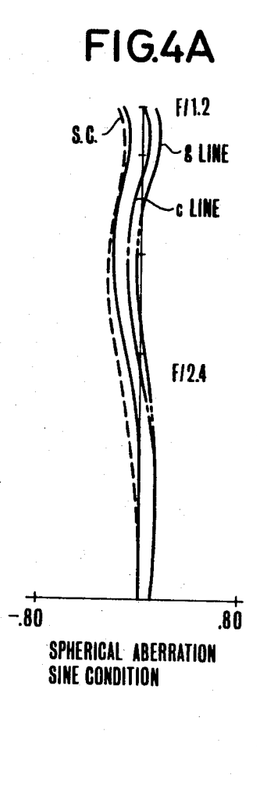
FIGS. 4 and 5 are aberration curves of Example 2 of the present invention.
Figure 4B:
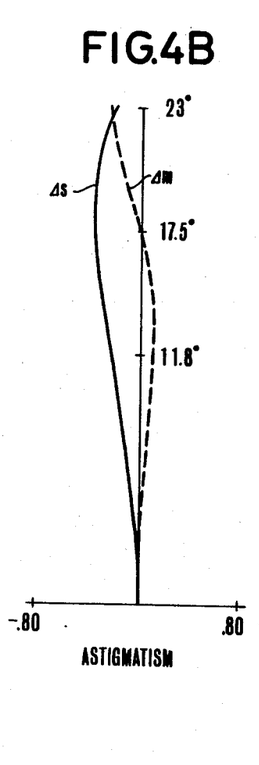
Figure 4C:
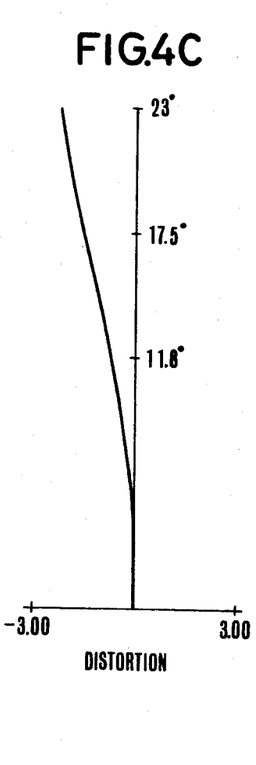
Figure 4D:
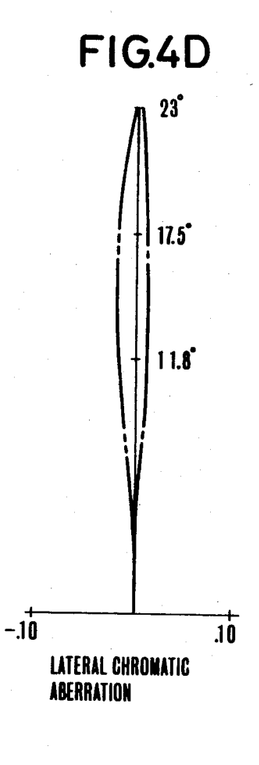
Figures 5A, 5B:
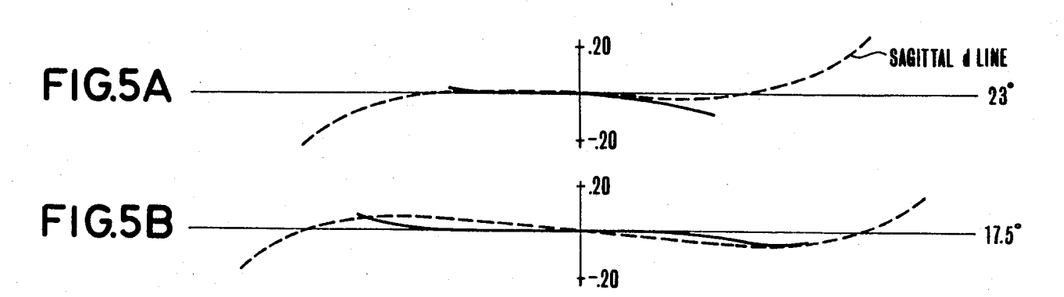
Figures 5C, 5D:
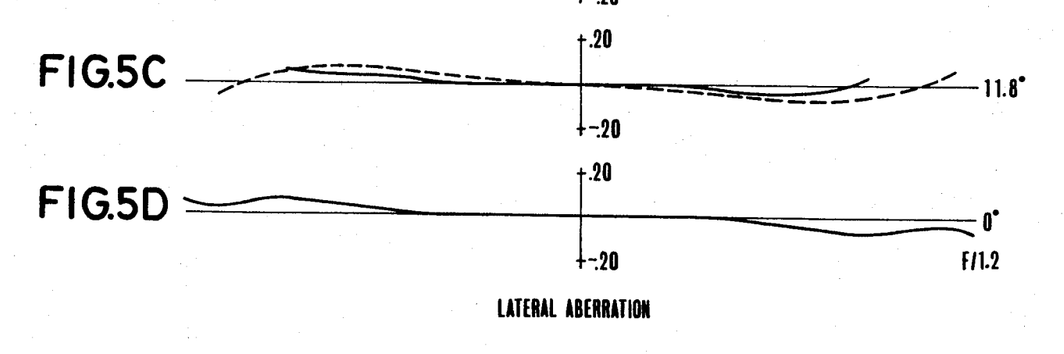
Figure 6A:
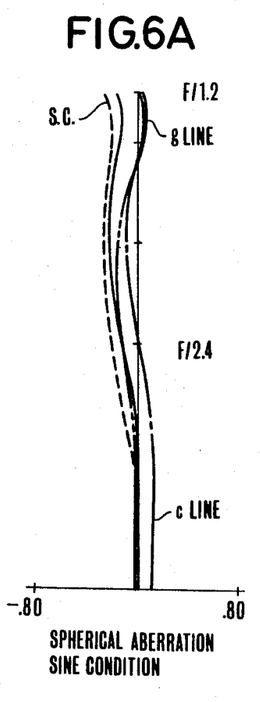
FIGS. 6 and 7 are aberration curves of Example 3 of the present invention.
Figure 6B:
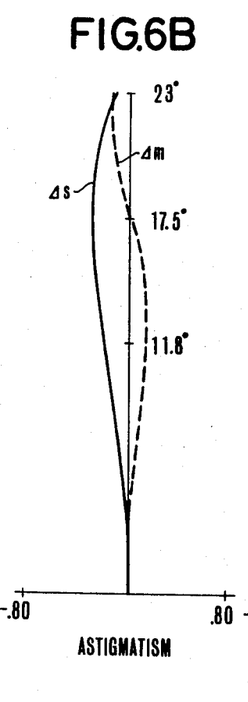
Figure 6C:
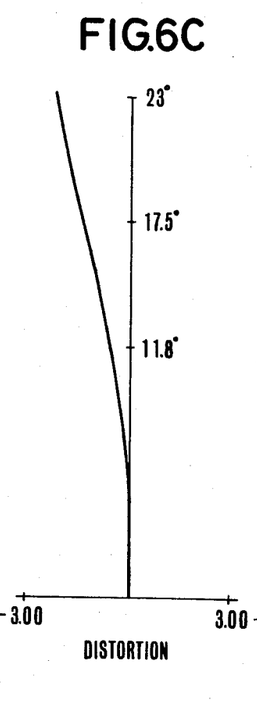
Figure 6D:
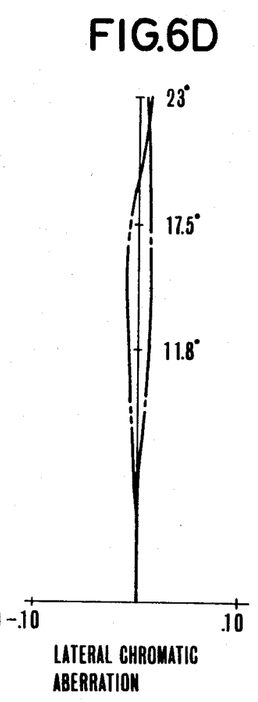
Figure 7A:
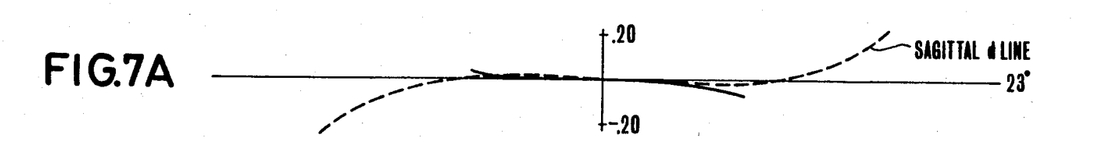
Figure 7B:
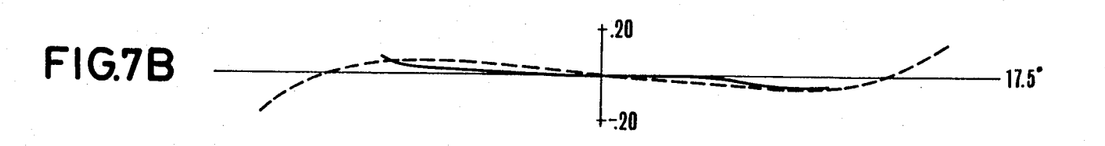
Figure 7C:
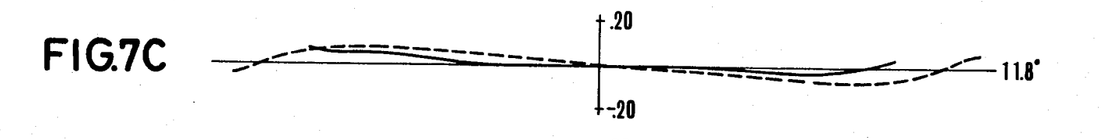
Figure 7D:
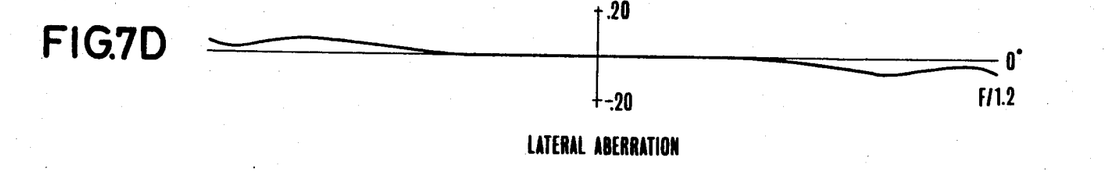
Figure 8A:
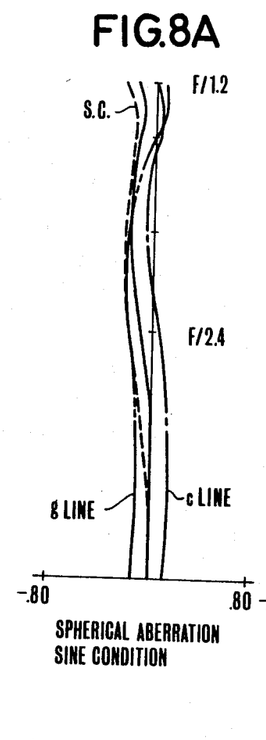
FIGS. 8 and 9 are aberration curves of Example 4 of the present invention.
Figure 8B:
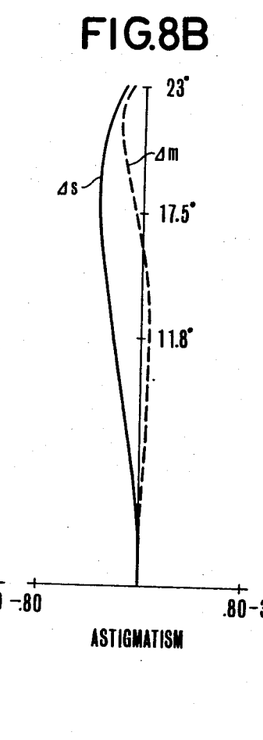
Figure 8C:
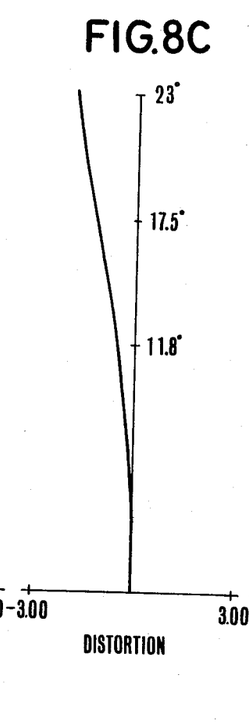
Figure 8D:
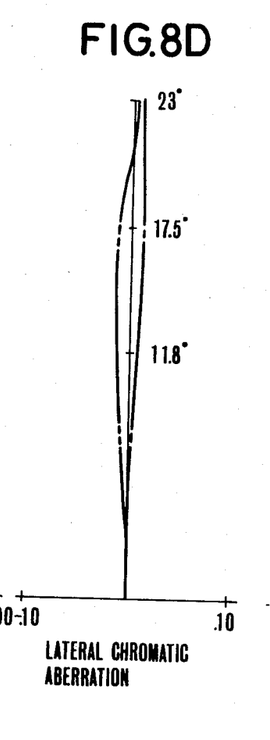
Figure 9A:
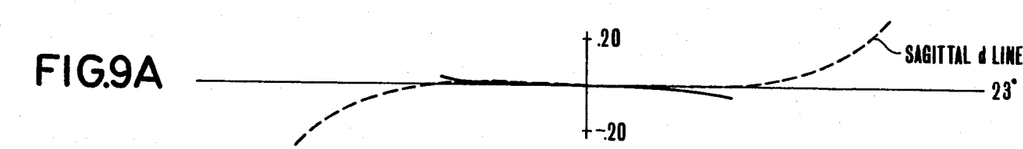
Figure 9B:
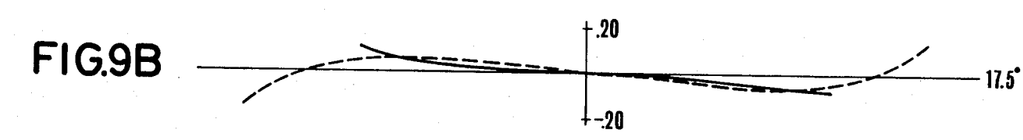
Figure 9C:
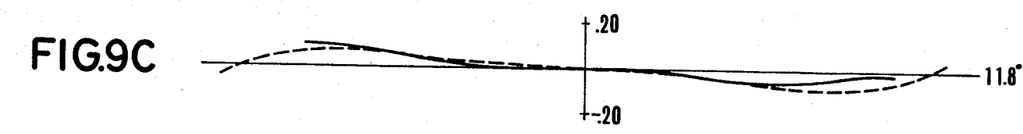
Figure 9D:
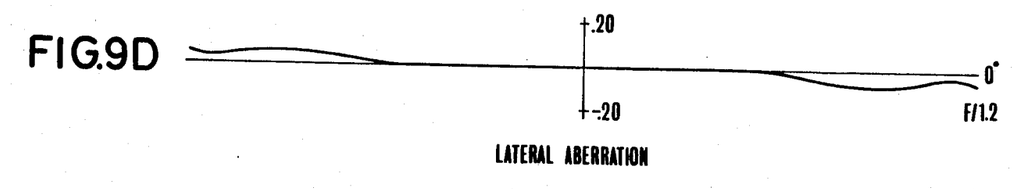

An embodiment of an objective according to the present invention comprises, from front to rear, a positive first lens of meniscus shape of convex curvature toward the front, a positive second lens of convex curvature toward the front, a negative third lens of concave curvature toward the rear, a negative fourth lens of concave curvature toward the front, a positive fifth lens of convex curvature toward the rear, a positive sixth lens of meniscus shape of convex curvature toward the rear, a bi-convex positive seventh lens with its rear surface of stronger curvature, and a bi-convex eighth lens, the 2nd and 3rd lens being cemented together, the 4th and 5th lenses being cemented together, and a diaphragm being arranged in a space between the 3rd and 4th lenses. Letting R1 to R14 denote the radii of curvature of the various lens surfaces, D1 to D13 the axial thicknesses of the various lenses and the axial separations between the successive lenses, N1 to N8 the indices of refraction (for d-line) of the various lenses, ν1 to ν8 the Abbe numbers of the various lenses, f the focal length of the entire system, f6, f7 and f8 the focal lengths of the 6th, 7th and 8th lenses respectively, and the first surface of the 2nd lens being an aspherical surface of such configuration that as is farther distant radially outwardly of the optical axis, the amount of deviation of the surface from the spherical surface of paraxial radius of curvature increases in a direction toward the front, the Gauss type large aperture photographic objective is characterized by satisfying the following conditions:

$$1.24 < \frac{D3 + D4}{D6 + D7} < 1.4 \tag{1}$$

$$1 < \frac{L}{f} < 1.1 \left( L = \sum_{i=1}^{13} Di \right) \tag{2}$$

$$1.78 < \frac{N1 + N2 + N5 + N6 + N7}{5} < 1.89 \tag{3}$$

$$2.17 < \frac{f}{R5} < 2.56 \tag{4}$$

-continued $$2.44 < \frac{f}{|R6|} < 2.7 \quad (5)$$

$$f6 < f7 < f8 \quad (6)$$

$$0.08 < n2 - n3 < 0.22 \quad (7)$$

$$0.1 < \frac{f}{R4} < 0.5 \quad (8)$$

Thus, the objective of the present invention is of the Gauss type with eight elements, and provides good correction for the various aberrations and particularly flare over the extended range of the image angle without stress when the various afore-mentioned conditions are satisfied. These various conditions are next described in greater detail.

Condition (1) serves for maintaining the necessary back focus. Below the lower limit, when the back focus becomes longer than necessary, and the diameter of the rear lens is increased, thus increasing the bulk and size of the objective. If the entire length is maintained constant, it also becomes a cause of increasing the diameter of the diaphragm.

Conversely, above the upper limit, when the back focus becomes too short, the mirror up function of the camera now becomes too difficult to perform.

Condition (2) defines the total length of the objective. The more compact the objective, the more convenient for portability. Below the lower limit, it is difficult to properly remove the flare at the fully open aperture. Above the upper limit, in order to assure a sufficient marginal amount of light, the diameters of the front and rear lenses are both required to be increased, thus increasing the bulk and size of the objective as the total length is also increased.

Condition (3) is a condition for using a high refractive index glass particularly in the positive lens of strong power. Below the lower limit, it becomes difficult to correct both flare and field curvature. And, the upper limit represents the maximum refractive index value in the glasses available on the market at the present time.

Conditions (4) and (5) when combined with condition (3) to well remove the flare (mainly the sagittal flare) while maintaining good correction of field curvature. Above the upper limit, the negative curvature of each of these surfaces is strong so that the flare removal effect is too weak. Conversely below the lower limit, when the negative curvature becomes too weak, although the flare at the fully open aperture only can be effectively removed, the Petzval sum becomes too large to prevent the deterioration of the field curvature. This makes it difficult to achieve an increase in the performance.

Condition (6) when combined with condition (1) serves to reduce the diameter of the rear lens to a necessary minimum or thereabout (the diameter determined by the fully open F-number light bundle), while maintaining the necessary amount in back focus. That is, of the 6th, 7th and 8th positive lenses, the refractive power is made stronger in the order nearer to the diaphragm so that as the light bundle of the maximum image angle after having passed through the diaphragm is first refracted toward the optical axis by the 6th lens of strong refractive power, and then proceeds to the 7th and 8th lenses successively, the diameter of the rear lens can be decreased without difficulty. Also since the gentle passage of the light bundle is possible, spherical aberration and coma can be corrected with ease. When the conditions are not satisfied, an increase in the diameter of the rear lens and deterioration of the spherical aberration and coma result and an increase in performance becomes difficult to achieve.

Condition (7) prevents the field curvature from increasing when the range of image angles is extended and minimizes the Petzval sum by defining, for the cemented second and third lenses, somewhat of a difference in refractive indices. Below the lower limit, the Petzval sum deteriorates. Above the upper limit, no combinations of glasses for use in the positive and negative lenses corrected for chromatic aberrations is available at the present time and an under-correction of longitudinal chromatic aberration (g-line) results.

Condition (8) when combined with condition (7) and the aspherical configuration facilitates good correction of both astigmatism and distortion. That is, the first or aspherical surface of the second lens produces over-corrected astigmantism and barrel type distortion, a part of which must be compensated for by the cemented surface R4, and somewhat refractive power must be had. Also, for ease of correction, a concentric configuration to the diaphragm is preferred. When this condition is not satisfied, the balance of the astigmatism and distortion is broken, and it becomes difficult to properly correct both of them. Further a problem arises in selecting glasses for use in the second and third lenses to correct chromatic aberration.

By satisfying the conditions as above, it is possible to provide a photographic large aperture objective with an image angle of 46° where F-number=1.2 which has flare limited to an extremely low level at the fully open aperture, and moreover, is properly corrected even for spherical aberration, curvature of the field and coma as will be seen from the examples of practical objectives of the invention.

Further, focusing of the objective in the embodiment of the present invention is performed by moving the 1st to 7th lenses only, while the 8th lens remains stationary. Hence, excellent image quality can be maintained throughout the focusing range. Particularly, when the range of variation of coma and astigmatism can be reduced to zero.

It is noted that the above-mentioned aspherical configuration may be expressed by the following formula:

$$X = R\{1 - (1 - H^2/R^2)^{\frac{1}{2}}\} + AH^2 + BH^4 + OH^6 + DH^8 + EH^{10}$$

where

R: the radius of curvature in the paraxial region.

H: the height from the optical axis.

X: the axial deviation of the surface at the height H from the optical axis with reference to the vertex of the surface (the direction in which the light advances is taken as plus)

A–E: aspheric coefficients.

In the following, the numerical data of examples of specific objectives of the invention are given. Table 1 shows the values of the factors in the above-described various conditions for Examples 1 to 4 of the invention.

TABLE 1

|   |   | Ex. 1 | Ex. 2 | Ex. 3 | Ex. 4 |
|---|---|---|---|---|---|
| 1 | $\dfrac{D_3 + D_4}{D_6 + D_7}$ | 1.367 | 1.382 | 1.263 | 1.279 |
| 2 | $\dfrac{L}{f}$ | 1.049 | 1.052 | 1.051 | 1.021 |
| 3 | $\dfrac{N_1 + N_2 + N_5 + N_6 + N_7}{5}$ | 1.8039 | 1.7868 | 1.8218 | 1.883 |
| 4 | $\dfrac{f}{R_5}$ | 2.399 | 2.495 | 2.353 | 2.22 |
| 5 | $\dfrac{f}{|R_6|}$ | 2.644 | 2.673 | 2.558 | 2.493 |
| 6 | $f_6$ | 131.43 | 146.17 | 135.2 | 142.05 |
|   | $f_7$ | 182.35 | 169.33 | 174.54 | 212.64 |
|   | $f_8$ | 743.87 | 747.52 | 701.96 | 584.58 |
| 7 | $n_2 - n_3$ | 0.1076 | 0.1311 | 0.1663 | 0.2103 |
| 8 | $\dfrac{f}{R_4}$ | 0.26 | 0.48 | 0.186 | 0.279 |

EXAMPLE 1

Focal Length $f = 100$ F-number $F = 1:1.2$ Image Angle $2\omega = 46°$

| Radius of Curvature | | Axial Thickness & Separation | | Index of Refraction (Nd) | | Abbe Number ($\nu d$) |
|---|---|---|---|---|---|---|
| $R_1$ | 108.673 | $D_1$ | 8.682 | $N_1$ | 1.804 | $\nu_1$ 46.6 |
| $R_2$ | 416.217 | $D_2$ | 0.291 | | | |
| $R_3$ | 78.3267 | $D_3$ | 22.87 | $N_2$ | 1.744 | $\nu_2$ 44.7 |
| $R_4$ | 384.362 | $D_4$ | 3.992 | $N_3$ | 1.63636 | $\nu_3$ 35.4 |
| $R_5$ | 41.6885 | $D_5$ | 30.851 | | | |
| $R_6$ | −37.8277 | $D_6$ | 2.326 | $N_4$ | 1.80518 | $\nu_4$ 25.4 |
| $R_7$ | 720.81 | $D_7$ | 17.328 | $N_5$ | 1.816 | $\nu_5$ 46.6 |
| $R_8$ | −64.003 | $D_8$ | 0.291 | | | |
| $R_9$ | −316.428 | $D_9$ | 7.752 | $N_6$ | 1.883 | $\nu_6$ 40.8 |
| $R_{10}$ | −85.8858 | $D_{10}$ | 0.194 | | | |
| $R_{11}$ | 1219.053 | $D_{11}$ | 6.492 | $N_7$ | 1.7725 | $\nu_7$ 49.6 |
| $R_{12}$ | −158.904 | $D_{12}$ | 0.388 | | | |
| $R_{13}$ | 745.854 | $D_{13}$ | 3.488 | $N_8$ | 1.62299 | $\nu_8$ 58.2 |
| $R_{14}$ | −1221.648 | | | | | |

Aspherical Surface: R3
Aspherical Coefficients:
$A = 0.$
$B = -1.172337 \times 10^{-7}$
$C = 6.303928 \times 10^{-11}$
$D = -6.621355 \times 10^{-14}$
$E = 2.08995 \times 10^{-17}$

EXAMPLE 2

Focal Length $f = 100$ F-number: $1:1.2$ Image Angle $2\omega = 46°$

| Radius of Curvature | | Axial Thickness & Separation | | Index of Refraction (Nd) | | Abbe Number ($\nu d$) |
|---|---|---|---|---|---|---|
| $R_1$ | 103.145 | $D_1$ | 8.682 | $N_1$ | 1.7725 | $\nu_1$ 49.6 |
| $R_2$ | 391.79 | $D_2$ | 0.291 | | | |
| $R_3$ | 75.892 | $D_3$ | 22.541 | $N_2$ | 1.757 | $\nu_2$ 47.9 |
| $R_4$ | 208.408 | $D_4$ | 3.992 | $N_3$ | 1.62588 | $\nu_3$ 35.7 |
| $R_5$ | 40.0794 | $D_5$ | 31.12 | | | |
| $R_6$ | −37.4074 | $D_6$ | 2.326 | $N_4$ | 1.7847 | $\nu_4$ 26.2 |
| $R_7$ | 612.724 | $D_7$ | 17.65 | $N_5$ | 1.816 | $\nu_5$ 46.6 |
| $R_8$ | −63.0719 | $D_8$ | 0.291 | | | |
| $R_9$ | −326.673 | $D_9$ | 7.752 | $N_6$ | 1.816 | $\nu_6$ 46.6 |
| $R_{10}$ | −88.3036 | $D_{10}$ | 0.194 | | | |
| $R_{11}$ | 1072.984 | $D_{11}$ | 6.492 | $N_7$ | 1.7725 | $\nu_7$ 49.6 |
| $R_{12}$ | −148.571 | $D_{12}$ | 0.388 | | | |
| $R_{13}$ | 930.722 | $D_{13}$ | 3.488 | $N_8$ | 1.62299 | $\nu_8$ 58.2 |
| $R_{14}$ | −930.722 | | | | | |

Aspherical Surface: R3
Aspherical Coefficients:
$A = 0.$
$B = -1.023571 \times 10^{-7}$
$C = 6.311869 \times 10^{-11}$
$D = -6.418568 \times 10^{-14}$
$E = 2.08995 \times 10^{-17}$

EXAMPLE 3

Focal Length $f = 100$ F-number: $1:1.2$ Image Angle: $2\omega = 46°$

| Radius of Curvature | | Axial Thickness & Separation | | Index of Refraction (Nd) | | Abbe Number ($\nu d$) |
|---|---|---|---|---|---|---|
| $R_1$ | 108.718 | $D_1$ | 8.682 | $N_1$ | 1.816 | $\nu_1$ 46.6 |
| $R_2$ | 362.048 | $D_2$ | 0.291 | | | |
| $R_3$ | 80.332 | $D_3$ | 22.029 | $N_2$ | 1.8061 | $\nu_2$ 40.9 |
| $R_4$ | 537.537 | $D_4$ | 3.992 | $N_3$ | 1.6398 | $\nu_3$ 34.5 |
| $R_5$ | 42.5072 | $D_5$ | 30.887 | | | |
| $R_6$ | −39.0911 | $D_6$ | 2.326 | $N_4$ | 1.80518 | $\nu_4$ 25.4 |
| $R_7$ | 314.522 | $D_7$ | 18.276 | $N_5$ | 1.788 | $\nu_5$ 47.4 |
| $R_8$ | −67.1236 | $D_8$ | 0.291 | | | |
| $R_9$ | −313.046 | $D_9$ | 7.752 | $N_6$ | 1.883 | $\nu_6$ 40.8 |
| $R_{10}$ | −87.4252 | $D_{10}$ | 0.194 | | | |
| $R_{11}$ | 1156.662 | $D_{11}$ | 6.492 | $N_7$ | 1.816 | $\nu_7$ 46.6 |
| $R_{12}$ | −162.01 | $D_{12}$ | 0.388 | | | |
| $R_{13}$ | 939.922 | $D_{13}$ | 3.488 | $N_8$ | 1.67 | $\nu_8$ 57.4 |
| $R_{14}$ | −939.922 | | | | | |

Aspherical Surface: R3
Aspherical Coefficients:
$A = 0.$
$B = -1.102309 \times 10^{-7}$
$C = 6.447527 \times 10^{-11}$
$D = -6.489253 \times 10^{-14}$
$E = 2.08995 \times 10^{-17}$

EXAMPLE 4

Focal Length $f = 100$ F-number: $1:1.2$ Image Angle $2\omega = 46°$

| Radius of Curvature | | Axial Thickness & Separation | | Index of Refraction (Nd) | | Abbe Number ($\nu d$) |
|---|---|---|---|---|---|---|
| $R_1$ | 131.824 | $D_1$ | 8.682 | $N_1$ | 1.883 | $\nu_1$ 40.8 |
| $R_2$ | 391.918 | $D_2$ | 0.291 | | | |
| $R_3$ | 76.9526 | $D_3$ | 20.347 | $N_2$ | 1.883 | $\nu_2$ 40.8 |

-continued

| Focal Length f = 100 F-number: 1:1.2 Image Angle 2ω = 46° | | | | | | |
|---|---|---|---|---|---|---|
| Radius of Curvature | | Axial Thickness & Separation | | Index of Refraction(Nd) | | Abbe Number (νd) |
| $R_4$ | 358.259 | $D_4$ | 3.992 | $N_3$ | 1.6727 | $ν_3$ 32.1 |
| $R_5$ | 45.039 | $D_5$ | 31.12 | | | |
| $R_6$ | −40.1116 | $D_6$ | 2.326 | $N_4$ | 1.84666 | $ν_4$ 23.9 |
| $R_7$ | 872.505 | $D_7$ | 16.703 | $N_5$ | 1.883 | $ν_5$ 40.8 |
| $R_8$ | −66.6741 | $D_8$ | 0.291 | | | |
| $R_9$ | −227.071 | $D_9$ | 7.752 | $N_6$ | 1.883 | $ν_6$ 40.8 |
| $R_{10}$ | −82.0924 | $D_{10}$ | 0.194 | | | |
| $R_{11}$ | 1116.827 | $D_{11}$ | 6.492 | $N_7$ | 1.883 | $ν_7$ 40.8 |
| $R_{12}$ | −225.097 | $D_{12}$ | 0.388 | | | |

-continued

| Focal Length f = 100 F-number: 1:1.2 Image Angle 2ω = 46° | | | | | | |
|---|---|---|---|---|---|---|
| Radius of Curvature | | Axial Thickness & Separation | | Index of Refraction(Nd) | | Abbe Number (νd) |
| $R_{13}$ | 813.953 | $D_{13}$ | 3.488 | $N_8$ | 1.6968 | $ν_8$ 55.5 |
| $R_{14}$ | −813.953 | | | | | |

Aspherical Surface: R3
Aspherical Coefficients:
$A = 0$.
$B = -1.056712 \times 10^{-7}$
$C = 6.529709 \times 10^{-11}$
$D = -6.54118 \times 10^{-14}$
$E = 2.08995 \times 10^{-17}$

| | 3rd-Order Aberration Coefficient | | | | |
|---|---|---|---|---|---|
| Example 1: | | | | | |
| R | SA | CM | AS | PT | DS |
| 1 | 0.192494 | 0.093189 | 0.045114 | 0.410108 | 0.220378 |
| 2 | 0.032586 | −0.122998 | 0.464267 | −0.107078 | −1.348236 |
| 3 | −0.630708 | 0.298742 | −0.211479 | 0.544649 | 0.607456 |
| 4 | 0.055447 | −0.085022 | 0.130373 | −0.009813 | −0.184866 |
| 5 | −0.327933 | −0.202072 | −0.124517 | −0.932841 | −0.651544 |
| 6 | −1.628909 | 0.741080 | −0.337158 | −1.179133 | 0.689844 |
| 7 | 0.003700 | 0.006144 | 0.010203 | 0.000458 | 0.017703 |
| 8 | 0.209744 | 0.140274 | 0.093814 | 0.702060 | −0.532272 |
| 9 | −0.000098 | 0.000763 | −0.005916 | −0.148196 | 1.194951 |
| 10 | 0.829482 | −0.264598 | 0.084405 | 0.545996 | −0.201093 |
| 11 | −0.046065 | 0.110651 | −0.265791 | 0.035751 | 0.552573 |
| 12 | 1.002910 | −0.286839 | 0.082038 | 0.274270 | −0.101906 |
| 13 | −0.254418 | 0.249650 | −0.244972 | 0.051465 | 0.189881 |
| 14 | 0.506250 | −0.288645 | 0.164574 | 0.031421 | −0.111749 |
| Σ | −0.055519 | 0.109771 | −0.115047 | 0.219116 | 0.341120 |
| Example 2: | | | | | |
| R | SA | CM | AS | PT | DS |
| 1 | 0.224067 | 0.094086 | 0.039507 | 0.422535 | 0.194012 |
| 2 | 0.030284 | −0.117376 | 0.454937 | −0.111239 | −1.332132 |
| 3 | −0.562610 | 0.266111 | −0.191709 | 0.567712 | 0.584473 |
| 4 | 0.037455 | −0.070395 | 0.132304 | −0.022024 | −0.207265 |
| 5 | −0.371123 | −0.213649 | −0.122994 | −0.960464 | −0.623727 |
| 6 | −1.622031 | 0.736874 | −0.334755 | −1.175388 | 0.686044 |
| 7 | 0.010308 | 0.017475 | 0.029625 | 0.001576 | 0.052895 |
| 8 | 0.253804 | −0.156847 | 0.096930 | 0.712424 | −0.500170 |
| 9 | −0.000913 | 0.005881 | −0.037868 | −0.137550 | −1.129509 |
| 10 | 0.699739 | −0.249953 | 0.089286 | 0.508857 | −0.213662 |
| 11 | −0.037132 | 0.098762 | −0.262679 | 0.040618 | 0.590623 |
| 12 | 1.039430 | −0.268533 | 0.069374 | 0.293344 | −0.093707 |
| 13 | −0.268319 | 0.251127 | −0.235037 | 0.041243 | 0.181378 |
| 14 | 0.518499 | −0.282325 | 0.153727 | 0.041243 | −0.106162 |
| Σ | −0.048543 | 0.111238 | −0.119353 | 0.222886 | 0.342110 |
| Example 3: | | | | | |
| R | SA | CM | AS | PT | DS |
| 1 | 0.192553 | 0.097280 | 0.049147 | 0.413306 | 0.233636 |
| 2 | 0.021005 | −0.092789 | 0.409897 | −0.124111 | −1.262470 |
| 3 | −0.641606 | 0.290575 | −0.204403 | 0.555595 | 0.629857 |
| 4 | 0.106185 | −0.149018 | 0.209130 | −0.010446 | −0.278831 |
| 5 | −0.279175 | −0.178521 | −0.114157 | −0.917891 | −0.659954 |
| 6 | −1.604196 | 0.749882 | −0.350533 | −1.141024 | 0.697229 |
| 7 | −0.007599 | −0.011648 | −0.017854 | −0.001692 | −0.029961 |
| 8 | 0.170771 | −0.125441 | 0.092144 | 0.656574 | −0.549977 |
| 9 | −0.000022 | 0.000173 | −0.001382 | −0.149796 | 1.207722 |
| 10 | 0.750372 | −0.252290 | 0.084825 | 0.536381 | −0.208862 |
| 11 | −0.039303 | 0.101922 | −0.264310 | 0.038848 | 0.584682 |
| 12 | 0.991451 | −0.282182 | 0.080313 | 0.277353 | −0.101797 |
| 13 | −0.273565 | 0.256788 | −0.241041 | 0.042684 | 0.186192 |
| 14 | 0.544326 | −0.291828 | 0.156457 | 0.042684 | −0.106765 |
| Σ | −0.068802 | 0.112901 | −0.111766 | 0.218465 | 0.340700 |
| Example 4: | | | | | |
| R | SA | CM | AS | PT | DS |
| 1 | 0.108713 | 0.084184 | 0.065190 | 0.355727 | 0.325946 |
| 2 | 0.010612 | −0.058889 | 0.326782 | −0.119651 | −1.149395 |
| 3 | −0.661759 | 0.317541 | −0.163571 | 0.609379 | 0.555683 |
| 4 | 0.105227 | −0.152508 | 0.221034 | −0.018637 | −0.293340 |
| 5 | −0.219741 | −0.149477 | −0.101680 | −0.892924 | −0.676571 |
| 6 | −1.695190 | 0.783603 | −0.362221 | −1.143016 | 0.695797 |
| 7 | 0.009906 | 0.016786 | 0.028444 | 0.001198 | 0.050230 |
| 8 | 0.262900 | −0.175746 | 0.117484 | 0.703320 | −0.548697 |
| 9 | −0.006842 | 0.024066 | −0.084651 | −0.206514 | 1.024161 |
| 10 | 0.969773 | −0.295295 | 0.089917 | 0.571225 | −0.201317 |
| 11 | −0.057876 | 0.131136 | −0.297130 | 0.041988 | 0.578103 |
| 12 | 0.757457 | −0.346764 | 0.158749 | 0.208325 | −0.168047 |

-continued

| | 3rd-Order Aberration Coefficient | | | | |
|---|---|---|---|---|---|
| 13 | −0.249139 | 0.263478 | −0.278642 | 0.050452 | 0.241324 |
| 14 | 0.568903 | −0.324838 | 0.185480 | 0.050452 | 0.134715 |
| Σ | −0.097056 | 0.117277 | −0.094815 | 0.211324 | 0.299161 |

Note:
SA: Spherical Aberration
CM: Coma
AS: Astigmatism
PT: Petzval Sum
DS: Distortion

What is claimed is:

1. A Gauss type large aperture photographic objective comprising eight elements of which:

the first is a positive meniscus lens of convex curvature toward the front, the second is a positive lens of convex curvature toward the front, the third is a negative lens of concave curvature toward the rear, the fourth is a negative lens of concave curvature toward the front, the fifth is a positive lens of convex curvature toward the rear, the sixth is a positive meniscus lens of convex curvature toward the rear, the seventh is a bi-convex positive lens with its rear surface of stronger curvature, and the eighth is a positive lens, said second and third lenses being cemented together, said fourth and fifth lenses being cemented together, the first surface of said second lens being aspherical, its aspherical configuration being such that as the distance from the optical axis increases, the deviation of the surface from the spherical surface of paraxial radius of curvature increases toward the front, and said objective being characterized by satisfying the following conditions:

$$1.24 < \frac{D3 + D4}{D6 + D7} < 1.4 \quad (1)$$

$$1 < \frac{L}{f} < 1.1 \left( L = \sum_{i=1}^{13} Di \right) \quad (2)$$

$$1.78 < \frac{N1 + N2 + N5 + N6 + N7}{5} < 1.89 \quad (3)$$

$$2.17 < \frac{f}{R5} < 2.56 \quad (4)$$

$$2.44 < \frac{f}{|R6|} < 2.7 \quad (5)$$

$$f6 < f7 < f8 \quad (6)$$

$$0.08 < n2 - n3 < 0.22 \quad (7)$$

$$0.1 < \frac{f}{R4} < 0.5 \quad (8)$$

wherein

R1, R2, ..., R14 are the radii of curvature of the various lens surface,

D1, D2, ..., D13 are the axial thicknesses of the various lenses and the axial separations between the successive lenses, N1, N2, ..., N8 are the indices of refraction of the various lenses (d-line), ν1, ν2, ..., ν8 are the Abbe numbers of the various lenses, f is the focal length of the entire system, f6, f7 and f8 are the focal lengths of the 6th, 7th and 8th lenses respectively.

* * * * *